Patented Mar. 24, 1936

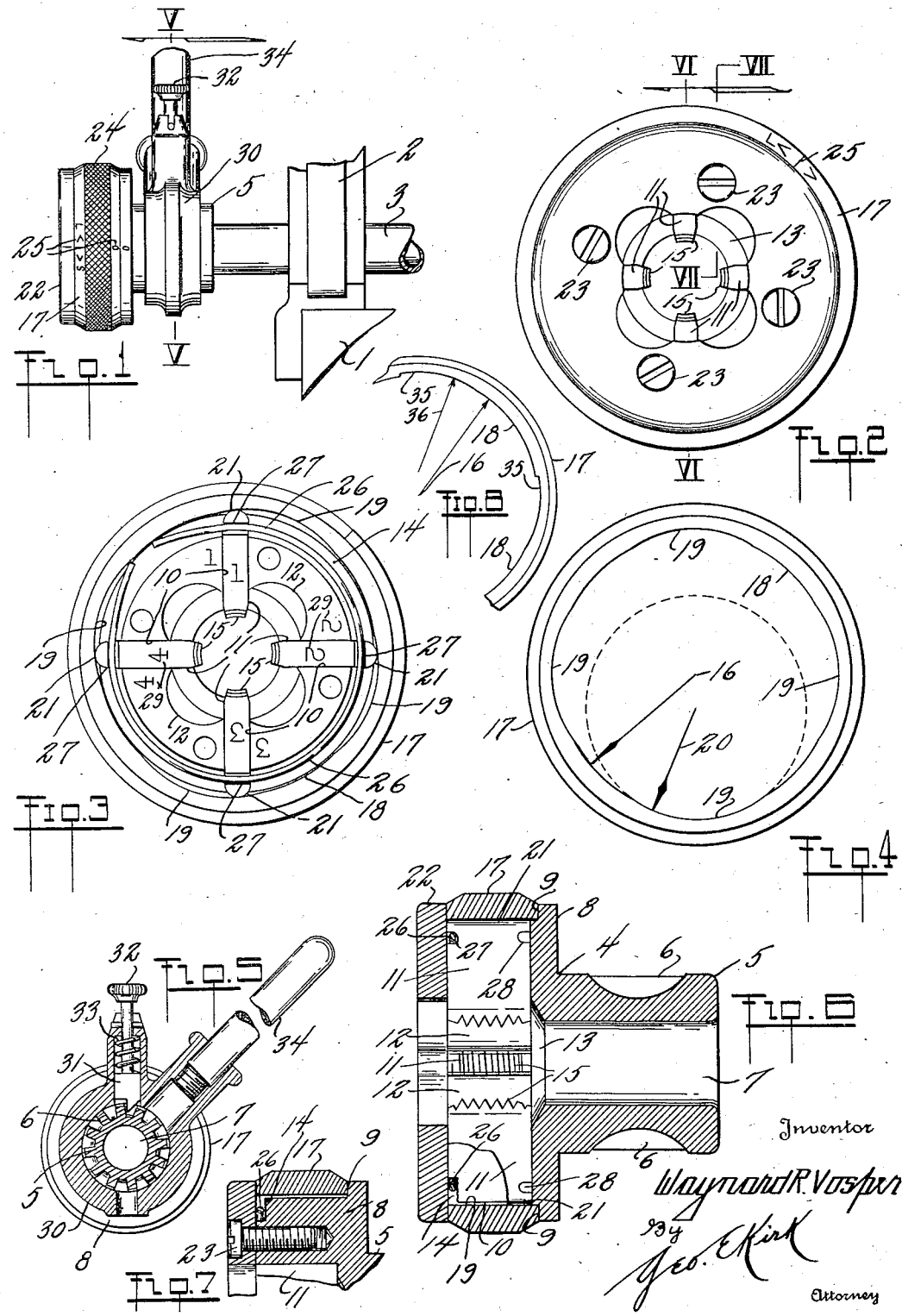

2,035,285

UNITED STATES PATENT OFFICE 2,035,285

THREAD CUTTING TOOL

Waynard R. Vosper, Toledo, Ohio, assignor to The Toledo Pipe Threading Machine Company, Toledo, Ohio, a corporation of Ohio Application February 25, 1935, Serial No. 8,037

2 Claims. (Cl. 10—122)

This invention relates to thread cutting tools.

This invention has utility when incorporated in a thread cutting tool in which the chasers or cutting elements may be simultaneously adjusted for varying the depth of the cut.

Referring to the drawing:

Fig. 1 is a view of an embodiment of the invention in position to generate a thread on a piece of cylindrical stock;

Fig. 2 is a view of the tool from the left of Fig. 1;

Fig. 3 is a view of the tool similar to Fig. 2 with the cover or ring clamping plate removed;

Fig. 4 is a plan view of the cam providing ring, showing the method of production;

Fig. 5 is a view on the line V—V, Fig. 1, looking in the direction of the arrow;

Fig. 6 is a view on the line VI—VI, Fig. 2, looking in the direction of the arrow;

Fig. 7 is a view on the line VII—VII, Fig. 2, looking in the direction of the arrow; and Fig. 8 is a fragmentary showing of a modified cam providing ring.

By the invention herein, a thread cutting tool is provided, in which the chasers may be simultaneously, quickly and easily adjusted to vary the depth of cut. In the disclosure, the device is shown for providing a standard thread cut on a piece of cylindrical stock, but elements may be provided to perform standard or special cutting or dressing operations on solid or tubular stock. The invention is particularly adaptable to bolt production in which a varying degree of thread depth cutting may be desired.

Support 1 may mount vise 2 for gripping cylindrical stock 3 upon which the tool herein may perform a threading operation. The tool comprises frame 4 providing guide or sleeve portion 5 having an external annular series of ratchet teeth 6 about axial opening 7. Outwardly extending from the sleeve 5 is flange 8 providing peripheral seat 9. The flange 8 also provides radially extending guides 10 for chasers 11. The flange portion 8 is provided with cut-out regions 12 between the guides 10 and also tapered portion 13 extending to the opening 7, by which construction ample chip clearance is provided. The flange 8 is also provided with peripheral seat portion 14 outwardly spaced from the seat 7.

The chasers 11 have cutting teeth or other work performing termini 15 which, as rotated about axis 16 of the work, perform the desired operation. This cutting or other operation may be varied by shifting the radial position of the chasers in the guides 10. To this end, a variable radial limit for each of the chasers is provided by ring 17 carried by the frame 4 in the seat 9 and angularly shiftable thereto. The ring 17 has inner face 18 provided with arc portions 19, radii 20 of which are of a different length than the radius of the face 18.

In the production of the ring 17, this angularly shiftable member is first produced with a continuous circumferential inner face 18 and a reamer or other cutting tool of a different radius than the face 18 cuts arc or cam face 19.

When the ring is assembled on the tool, outer semi-cylindrical termini 21 of each chaser coacts with a cam face 19, and as the ring 17 is shifted relatively to the frame 4, the distance between the center of work 16 and the portion of the face 19 coacting with the chaser termini 21 varies so that the chaser may be moved radially inwardly or outwardly as desired.

The predetermined setting of the chasers in work position may be fixed by plate 22 being assembled with the flange 8 by means of bolts 23 engaging this flange between the chasers. The width of the chasers and the ring is such that they form a continuous face with the flange 8 so that as the bolts 23 tighten the plate against the frame 4, a clamping action of the ring is had between the plate 22 and seat 9. This prevents further shifting of the ring; also further shifting of the chasers is prevented by the limiting action of the cam faces 19. The ring 17 may be provided with external knurl portion 24 to facilitate rotary shifting and indexing 25 between the ring and frame 4 may identify the predetermined set. In that the cam faces 19 are true arcs, a zero setting of the chasers or the intermediate between limits would place the semicylindrical termini 21 of the chasers approximately as shown in Fig. 3, so that a clockwise movement of the ring would shift the chasers inwardly, while an anti-clockwise movement would allow the chasers to shift outwardly.

The chasers are maintained at their radial limit or against the cam faces by means of spring 26 nesting in the seat 14 and engaging seats 27 in each of the chasers. Each chaser is provided with opposing seats 28 so that they are reversible in the frame. The single spring 26 operates to maintain all the chasers in their outward radial limit, while indexing 29 of the chasers and frame facilitates the proper disposal of a set of chasers about the axis of the tool.

Various means may be employed to rotate the tool to generate the thread, a typical drive being shown herein as comprising a ring 30 about the portion 5 carrying pawl 31 to engage the teeth 6, the pawl being reversible by handle 32 against resistance of spring 33 and the ring 30 rotatable by manipulation of handle 34. This provides a one-way clutch, the pawl 31 determining the drive direction.

While in normal threading operation the cylindrical stock may extend through the opening 7 as a guide for the chasers, yet the tool may be reversed to bring the cut up to a shoulder where close operation is desired. As a typical instance, the cam may provide for a $\frac{1}{32}''$ under to a $\frac{1}{32}''$ over cut, this being accomplished by providing a ring with an inner face of 2½" diameter and cutting the cam faces with a 1" radius reamer having its axis .275" from the axis of the ring face 18. By the use of fillister head bolts to clamp the plates projections are eliminated and a close cutting against a shoulder may be accomplished. There is herein shown a tool of great flexibility, simple and compact, quickly and easily adjusted.

The ring 17 may have its inner face 18 reworked to provide various cam faces for controlling the chasers. A modification of the cam controlling faces is shown, Fig. 8, wherein the face 18 as a circumference of the axis 16 may have cam faces 35 formed thereon by a broach or other tool; the cam faces 35 being arcs of radii 36, the axes of which are eccentric of the axis 16.

What is claimed and it is desired to secure by Letters Patent is:

1. A thread cutting tool comprising a sleeve providing a guide for work, said sleeve terminating in an outwardly extending flange at one end, a plate opposing said flange, bolts mounting the plate against angular shifting as to the flange and to hold the plate concentric with the flange, said plate and flange having a series of opposing registering outwardly extending guide ways, chasers in said ways, a spacer ring clamped by the bolts for thereby spacing the plate from the flange and provided with internal cam means for determining the radial position in said ways of the respective chasers, and spring means outwardly throwing the chasers in the guide ways to abut the ring cam means, said ring as unclamped by said bolts for angular shifting relatively to the plate and flange being effective to release the chasers for adjustment and as tightened to hold the chasers fixed.

2. A thread cutting tool comprising a sleeve providing a guide for work, said sleeve terminating in an outwardly extending flange at one end, a plate opposing said flange, bolts mounting the plate against angular shifting as to the flange and to hold the plate concentric with the flange, said plate and flange having a series of outwardly extending guide ways, chasers in said ways, a spacer ring between the plate and flange, said ring on its inner side having a symmetrical arc face for each chaser, and spring means outwardly throwing the chasers in the guide ways to abut the ring arc faces, said bolts between the plate and flange being effective to unclamp the ring thereby to permit manual shifting of the ring angularly relatively to the plate and flange.

WAYNARD R. VOSPER.